(12) United States Patent
Sandler et al.

(10) Patent No.: US 8,214,361 B1
(45) Date of Patent: Jul. 3, 2012

(54) ORGANIZING SEARCH RESULTS IN A TOPIC HIERARCHY

(75) Inventors: Mark M. Sandler, Jersey City, NJ (US); Kushal Dave, New York, NY (US)

(73) Assignee: Google Inc., Mountain View, CA (US)

( * ) Notice: Subject to any disclaimer, the term of this patent is extended or adjusted under 35 U.S.C. 154(b) by 521 days.

(21) Appl. No.: 12/242,464

(22) Filed: Sep. 30, 2008

(51) Int. Cl.
*G06F 17/30* (2006.01)

(52) U.S. Cl. .................... 707/732; 707/733; 707/734

(58) Field of Classification Search .................... None
See application file for complete search history.

(56) References Cited

U.S. PATENT DOCUMENTS

| | | | |
|---|---|---|---|
| 7,668,789 B1 * | 2/2010 | Forman et al. | 706/20 |
| 2006/0248054 A1 * | 11/2006 | Kirshenbaum et al. | 707/3 |
| 2008/0208717 A1 * | 8/2008 | Suleymanov | 705/27 |

* cited by examiner

*Primary Examiner* — Baoquoc To
(74) *Attorney, Agent, or Firm* — Fish & Richardson P.C.

(57) ABSTRACT

Methods, systems, and apparatus, including medium-encoded computer program products, for searching a data set and returning search results organized in a hierarchy of categories are disclosed. A set of categories is provided for organizing a set of search results, wherein each category is associated with one or more search results. The set of search results is organized into a hierarchy of categories, the hierarchy including at least one category from the set of categories. At least a portion of the hierarchy of categories is displayed and a user request to modify the hierarchy of categories is received. The hierarchy of categories is modified in accordance with the user request.

23 Claims, 7 Drawing Sheets

| Site A | Site B | Site C | Site D | Site E | Site F |
|--------|--------|--------|--------|--------|--------|
| Category 1 | Category 2 | Category 2 | Category 1 | Category 2 | |
| Category 3 | Category 3 | Category 4 | Category 2 | Category 3 | |
| Category 5 | Category 6 | Category 5 | Category 5 | Category 6 | |
| | Category 7 | | Category 8 | | |

ORGANIZING SEARCH RESULTS IN A TOPIC HIERARCHY

TECHNICAL FIELD

This description relates to data search technology, specifically computer search engine technology.

BACKGROUND

Electronic data storage has grown exponentially in volume with the parallel growth of the computer. With the growth in computer networks and, specifically, the internet, hundreds of exabytes ($10^{18}$ or $1024^6$ bytes) of data are currently stored on various computers, data servers, and other network devices worldwide, with that number surely to increase in coming years. Data search algorithms, software, and search engine systems have developed, in part, to help computer users navigate the vast swaths of data stored on private networks, the internet, or even their own computers. Some web search tools are implemented in web browsers, such as search engine prompts integrated into the web browser toolbar, shortcuts for favored web locations, and bookmarks.

The set of search results returned by a search engine is based on search algorithms employed by the search engine and the robustness of the dataset searched by the search engine. Search results returned by a search engine for a given search can sometimes be over- or under-inclusive. Some search engines allow a user to enter additional terms or modifiers to refine the search query, thereby generating a new set of search results based on the refined search.

SUMMARY

Systems and methods can be implemented to organize computer search results into a hierarchy of categories for display to a user, the hierarchy capable of being modified according to requests from the user.

In one general aspect a set of categories is provided for organizing a set of search results. Each category is associated with one or more search results. The set of search results is organized into a hierarchy of categories, the hierarchy including at least one category from the set of categories. At least a portion of the hierarchy of categories is displayed. A user request to modify the hierarchy of categories is received. The hierarchy of categories is modified is accordance with the user request.

Implementations can include one or more of the following features. A search query can be received and a search of a data set conducted based on the search query to generate a set of search results. The hierarchy of categories can be modified by adding a new category to generate a modified hierarchy of categories, the new category capable of being associated with one or more search results. Sets of search results can be defined, each set corresponding to a category for organizing search results and including the one or more search results associated with the category. A search result can be selected from a set of search results. A new category can be added by receiving a user selection from a list of categories. New categories can be added by receiving user entries defining new categories. Defining new categories can include automatically selecting a previously defined category not included in the hierarchy on the basis of the user entry.

Further implementations can include one or more of the following features. A plurality of user requests to modify the hierarchy can be received. The user request to modify the hierarchy of categories can include feedback data relating to one or more of the categories, the method further comprising storing the feedback data in connection with a profile, wherein the profile is associated with the user. A webpage can be associated with at least one category in response to at least one user request to associate the webpage with the at least one category. A webpage can be displayed on a web browser and at least one category can also be displayed in connection with the webpage. A user request can be received to associate the webpage with the at least one category.

Additional implementations can include one or more of the following features. The hierarchy of categories can be presented on a graphical user interface. The association of a category with a search result can be altered based on the user feedback data. A user request can be received to associate a file in the data set with a category. A file in the data set can be associated with the category according to the user request. The file can be a webpage and the user request to associate a file with the category can be received through a web browser presenting the webpage. The file can be included in a future set of search results and the category associated with the file according to the user request can be identified in a set of categories associated with the set of future search results.

In another general aspect a system can search a data set and return search results organized in a hierarchy of categories. The system can include at least one user computer device, at least one data server storing a data set, and a search engine adapted to access the at least one data server. The at least one search engine is further adapted to search the data set to return search results organized in a set of categories, the categories further organized in a hierarchy of categories. Additionally, the search engine can accept a request to modify the hierarchy of categories and modify the hierarchy of categories in response to the request to modify the hierarchy.

Implementations can include one or more of the following features. The data set can be a worldwide public network. The service engine device can include a subtraction module capable of responding to a user request to modify the hierarchy of categories by removing at least one category from the hierarchy according to the user request. The search engine device comprises a category adding module capable of responding to a user request to modify the hierarchy of categories by adding at least one category to the hierarchy according to the user request. The at least one added category is a user-created category. The service engine device can include a user voting module capable of receiving feedback data and using the data to affect the future organization of search results into a hierarchy of categories.

In another general aspect an article includes machine-readable medium stores instructions for causing computer processing apparatus to perform the following operations. A search query is received. A search of a data set is conducted based on the search query to generate a set of search results. A set of categories is identified associated with the set of search results. The set of search results is organized into a hierarchy of categories. The hierarchy of categories is presented on a graphical user interface. A user request is received to modify the hierarchy of categories. The hierarchy of categories or a future hierarchy of categories is modified based on the received user request to modify.

Implementations can include one or more of the following features. The user request to modify the hierarchy of categories can be a request to add a new category associated with at least one search result in the set of search results. The user request to modify the hierarchy of categories can be user feedback data related to at least one category in the hierarchy of categories. The association of a category with a search result can be altered based on the user feedback data. A user request can be received to associate a file in the data set with a category. A file in the data set can be associated with the category according to the user request. The file can be a webpage and the user request to associate a file with the category can be received through a web browser presenting the webpage. The file can be included in a future set of search results and the category associated with the file according to the user request can be identified in a set of categories associated with the set of future search results.

Implementations may include systems, methods, software products, and machine-readable media storing instructions for causing data processing apparatus to perform operations. The details of one or more implementations are set forth in the accompanying drawings and the description below. Other features will be apparent from the description and drawings, and from the claims.

DESCRIPTION OF DRAWINGS

FIG. 4 is an example association table of categories and search results corresponding to the example search results of FIG. 3.

Like reference symbols in the various drawings indicate like elements.

DETAILED DESCRIPTION

A search engine device can generate a set of search results in response to a user search query. The set of search results can be organized into an organized set of categories, or hierarchy, related to the search results, providing a high-level summary of the set of search results to the user.

A user can re-sort, filter, or display a set of search results organized into a hierarchy of categories and do so on a category-by-category basis. Indeed, the user can modify and customize the categories as well as expand the body of search results associated with the categories, so as to make the operation of a category-based search engine more robust. In addition, user feedback data can be provided related to the content and function of the search engine, adding a wiki-type element of intelligence and content to a category-based search engine.

Figure 1A:
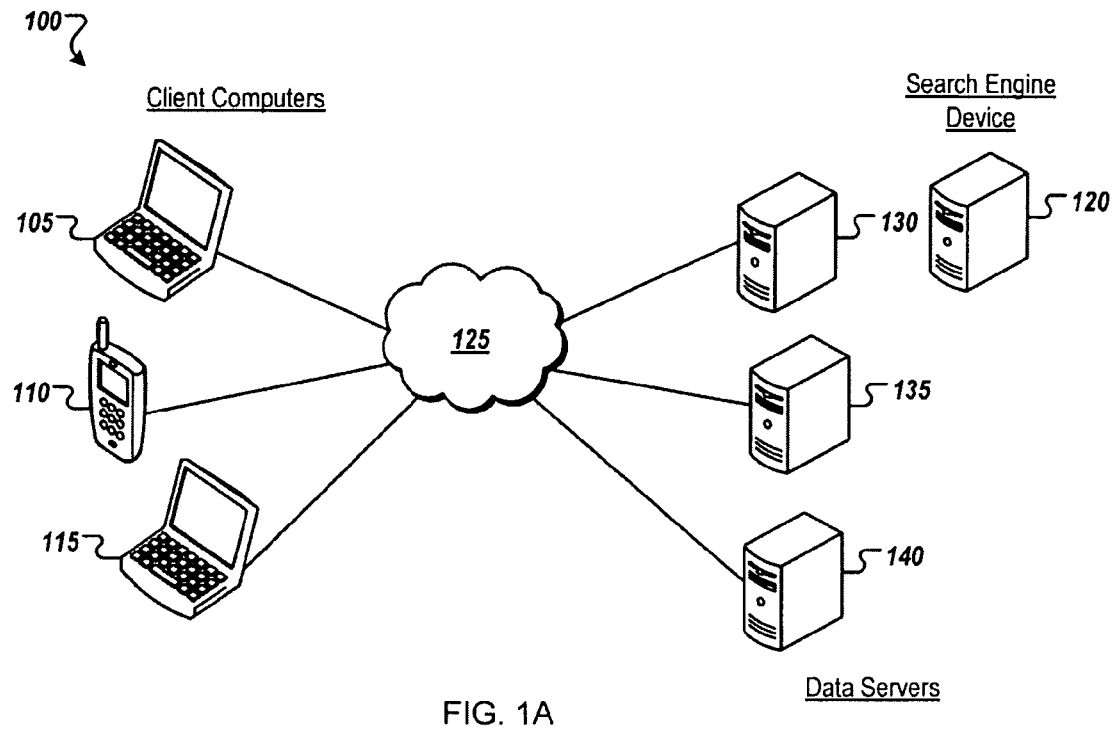
FIG. 1A is a block diagram of a system for organizing computer search results into a hierarchy of categories for display to a user.

As shown in FIG. 1A, a system 100 for use in organizing search results in topical hierarchies is illustrated. In this example, a plurality of user client devices 105, 110, 115 are in communication with a search engine device 120. The user client devices 105, 110, 115 communicate with the search engine device 120, for example, by accessing a webpage or web portal associated with the search engine device 120. In some examples, users 105, 110, 115 can access the search engine device 120 through an API on a third-party website or a software tool stored locally on the user device that links to the search engine device 120. The users of the client devices 105, 110, 115 may then request the search engine device to perform certain search and organization tasks, including those operations and tasks described below.

While the search engine device 120 is illustrated in FIG. 1A as a computer server device attached to a network 125, the search engine device 120 could be any computing device, or even a software module installed on the user client devices 105, 110, 115 themselves, capable of accessing, searching, and organizing stored data sets associated with or otherwise capable of being searched by the search engine device 120. Indeed, the search engine device 120 may be a plurality of servers or computers, or a network of computer servers.

FIG. 1A illustrates a plurality of computers and server devices 130, 135, 140 communicatively coupled to the network 125. The network 125 allows the search engine device 120 to communicate with computing devices 130, 135, 140 and thereby allows the search engine device 120 to access data stored by the computing device data sources 130, 135, 140. The search engine device 120 may mine data from computing devices and cache the data for use in providing search results. Not all data stored on data sources 130, 135, 140 may be available for access and searching by the search engine device 120. The data sources 130, 135, 140 may, respectively, determine what data can and cannot be accessed by the search engine device 120. For example, the computing devices, acting at least in part as web servers, may only allow access to data associated with public webpages. A searchable data set can be the data accessible for searching and organizing by the search engine device 120.

The search engine device 120 can return a set of search results based on the searchable data set. The set of search results may be made up of a single or a plurality of search results from the searchable data set, or even a set of zero results, where no search results were capable of being found in a given search. The search may be in response to a user input such as a search query or may be automatically initiated by another program or computer function. The initial set of search results can be generated using any search techniques or algorithms known in the art.

In some instances, a given search can yield thousands, if not millions of search results. Given the constraints of graphical interfaces and human capacity to usefully interact with presentations of large amounts of information, only a relatively small portion of the results may be usefully displayed to the user at a time. Depending on the algorithm employed by the search engine, the first portion or portions of search results may not contain those results sought by the user. This may not mean that the desired search results are not contained in the body of returned search results however. Finding the desired results from a raw list of search results may require the user to sift through pages of displayed search results. However, by organizing the search results that are returned by the search engine device into categories, the user may be able to comprehend the entirety of the returned search result set, on a categorical basis, all within a single displayed presentation. By selecting a single category of search results from the entire body of search results, the user can then pare down the number of search results into a set more apt to return the results originally desired by the user.

Figure 1B:
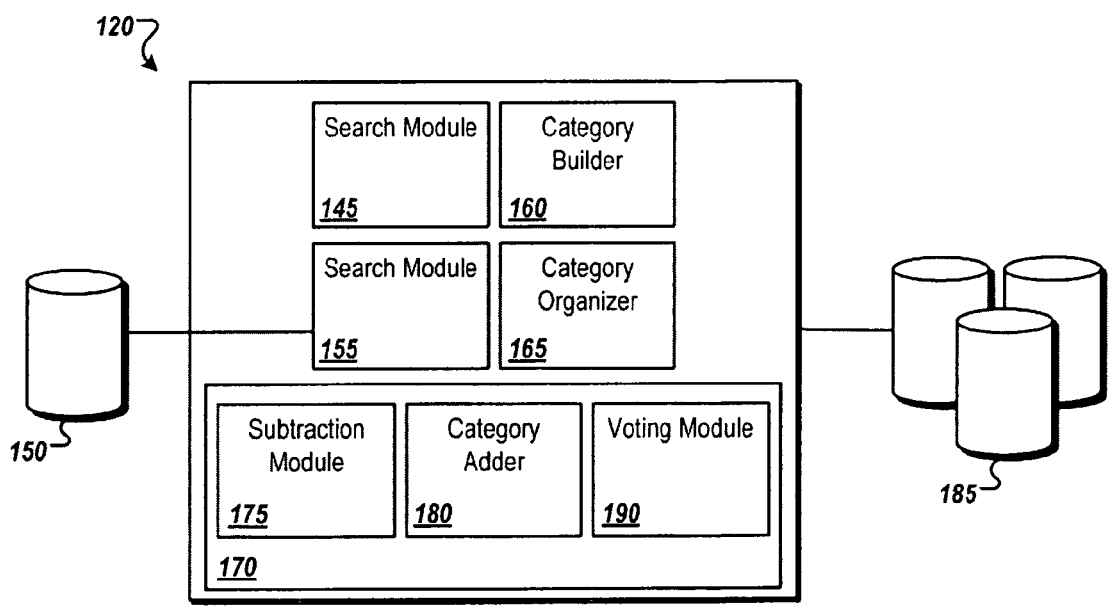
FIG. 1B is a block diagram illustrating an example search engine device.

As shown in FIG. 1B, a search engine device 120 can include several modules. For example, a search module 145 can be provided capable of generating a searchable data set in response to an entered search term. The search module 145 may consult a cache 150 of data mined by a data mining module 155, or the search module may search the data set directly to return relevant search results for a query. The search engine device 120 can also include a category builder 160. The category builder 160 can associate individual web pages, documents, presentations, and other files returned in the searchable data set, with a set of categories. Metadata can be stored in conjunction with the categories setting forth which individual search results are associated with each category. In some implementations metadata may be stored for each available search result in the set of search results, indicating the categories that are associated with each search result.

A category organizer 165 can organize a set of search results into categories. For a given search query, a set of search results can be generated. The category organizer can identify a set of categories related to the set of search results. The set of categories can include every category associated with at least one search result in the set of search results. Alternatively, the set of categories may only include a subset of all categories having a relationship to the set of search results. For example, the set of categories may be limited to a fixed number of categories. The set of categories may only include the most popular categories, a set of favorite categories, or a set of categories otherwise selected to possess those categories most relevant to the set of generated search results. The set of categories may be a set that includes enough different categories to ensure that a certain percentage of the generated search results are associated with at least one category. The category organizer 165 can define the set of categories for a given search using algorithms designed to reach one or more of the above described objectives, as well as other objectives.

The first set of categories identified and organized by the category organizer 165 of the search engine device 120 can be an initial category set. The initial category set generated for a search term can be displayed to a user. Search results corresponding with categories in the hierarchy may be displayed in conjunction with the displayed hierarchy. Some examples may require a user to select a given category or categories in the displayed hierarchy before displaying search results corresponding to the selected corresponding categories or subcategories.

The category organizer 165 can further organize a set of categories, including the initial set, into a hierarchy. For example, the set of categories can be organized so as to only present the most relevant or helpful categories or to present those categories first. A most relevant category can, for example, be a category associated with the largest number of returned search results or may be a category identified, for example by users of the search engine device 120, through a voting scheme, as the most useful or relevant. The category organizer 165 can further organize the set of categories into a hierarchy including sub-categories. For example, for a category "automobiles," sub-categories corresponding to various automobile makes (e.g., "Toyota," "Ford," "BMW") may be provided. Hierarchies including categories and sub-categories can be displayed to the user as folders and sub-folders.

The search engine device can also include a category modifier module 170. An initial set of categories can be presented as a hierarchy in response to a search query. The user can request that the displayed hierarchy and categories be modified for the set of search results returned. A request to modify the hierarchy can take a variety of forms. Accordingly, various sub-modules can be included with category modifier module 170. For instance, a subtraction module 175 can process a user request to remove certain categories from the displayed hierarchy, possibly removing affiliated search results from the search results set as well.

In some examples, the request to modify the hierarchy could ask the search engine device to re-sort or limit the set of search results, based on the modification. For example, a request to remove a category from the hierarchy can result in the removal of all search results associated with the removed categories, "blacklisting," or removing, search results associated with the removed categories from the search results displayed to the user. Additionally, a user could "whitelist" search results within a set of returned search results by selecting one or more categories from the hierarchy, thereby narrowing the set of displayed search results to only those associated with the selected categories. The search engine could also expand or otherwise further refine the set of search results by replacing blacklisted or non-whitelisted categories with new categories identified as more closely related to accepted categories and associated with search results in the set of whitelisted search results. In some implementations, a blacklist or whitelist request can be fed back to the search engine indicating that certain categories within the search engine-generated hierarchy of categories are more favored than others for a given search query.

In some implementations, a category adder 180 can handle a user request to include a new category to the hierarchy of categories displayed. For example, a user might submit a new category by entering the name of a category not displayed in the hierarchy. This may involve entering text into a text field on a graphical user interface displaying the search results to the user. The category adder 180 can add the user-defined category to the current search or future searches involving similar subject matter. In some implementations, the category adder 180, instead of generating an original, user-created category in response to a user suggestion for a category, can process the user suggestion to identify an existing category substantially similar to or related to the user suggestion. In some implementations, a category adder 180 can also seek to automatically associate individual search results with a new, user-created category by, for example, identifying search results with text or other category associations related to words describing the new, user-created category.

In some implementations, the user might submit a new category by selecting from other categories not included in the initial set of categories displayed. These other categories can be previously-defined categories. Previously defined categories may have been developed by an operator or developer of the search engine device 120. In other examples, the user or other earlier users of the search engine device may have defined the pre-existing categories. A user can add a category to the hierarchy by selecting a category from a list of categories displayed to the user. In some implementations, a user can search for the existence of a preexisting category using the search engine device 120. A list of available, preexisting categories can be generated in response to a user query searching for the existence of a desired category term. For example, the user may enter a term, seeking to find previously defined categories related to the term. As a result, the category adder 180 can generate a tailored list of categories available for selection by the user that match or approximate the desired category term entered by the user. In some implementations the user may be able to simultaneously submit more than one new category for a search.

Upon submitting a new category to modify the displayed hierarchy, the category adder 180 may receive and then process the new category request to see if any search results in the set of search results correspond to the new category. If so, the category builder 160 of the search engine device 120 can associate search results corresponding to the new category with the new category. Upon receiving and accepting a new category, the category organizer 165 can modify the displayed hierarchy by adding new categories to the hierarchy, even replacing categories from the displayed hierarchy with the new categories, thereafter displaying the modified hierarchy with the new category or categories. Using this renewed hierarchy display, the user could then select or otherwise consult the new category to find search results corresponding to that category. If no search results correspond to the new category, the search engine device may return an error message, or otherwise communicate to the user that the new category failed to yield corresponding search result hits. In other implementations, the new category can be added to the hierarchy of categories as a sub-category of a category in the initial set of categories.

A new category submitted by the user to modify the displayed search results may be stored in a memory, in order to make the category available to the user, or even other users, in later searches. For instance, a user may choose to have a category saved in the memory of the device used by the user to access the search result device, or even saved in the memory of the search engine device or other memory 185 associated with the search engine device 120, such as a network of storage servers dedicated to the search engine device 120. Alternatively, some examples may allow new categories to be automatically saved. New, user-defined categories may be saved in search engine device-controlled memory 185 in conjunction with a user profile, cookies, or the like. User requests to remove one or more categories, or otherwise modify a category can also be saved by the search engine device 120. Saving user-defined categories and modification requests permits the search engine device 120 to simultaneously accumulate feedback data on the accuracy and usefulness of certain category hierarchies it generates while populating the set of available categories from which the search engine device 120 can draw and assemble future category hierarchies.

In some implementations, user-created categories can be local, in that a user's customized categories or category associations are only applied in connection with the user's own computing device, browser, or search engine user account. Cookies or other user profile data can be used to save a user's customized profile. User-created categories can also be global in that they are used and aggregated by the search engine device to build the set of available categories from which the search engine can draw to generate a hierarchy of categories in response to a search. Additionally, in some implementations, user-created categories can be both locally and globally applied by the search engine device.

The submission of new categories may not be the only form of a user request to modify the displayed hierarchy that is capable of being stored, and fed back to the decision-making algorithm responsible for building a hierarchy of categories associated with a given search result set. For example, the search engine device 120 may save other requests to modify the category hierarchy, such as requests to remove certain categories from the hierarchy using the subtraction module 175, or otherwise regenerating the hierarchy based on feedback provided by the user. For example, in some implementations, the user is capable of selecting one or more categories and requesting the search engine 120 to regenerate the hierarchy with some substitute or additional categories similar to the categories selected. The search engine device 120 may save these selections as feedback data, noting that these selections may be more appropriate than other non-selected categories for the particular search query or set of search results corresponding to the originally-generated category hierarchy. In some implementations, the user may request that the search engine device remove certain categories from the hierarchy, which the user deems less appropriate to the goal of the user's search. The search engine may save these instances of user feedback indicating that certain categories are not useful.

Feedback data may influence the search engine's 120 future attempts to generate an appropriate category hierarchy for the same or similar search queries or search results sets. It may require that repeated, consistent feedback be returned, before the search engine device 120 elects to incorporate the feedback data into its hierarchy building procedures. This feedback data may thereby build intelligence into the search engine's hierarchy-building algorithm. A voting module 190 may manage feedback data collected by the search engine 120, employing algorithms for registering and interpreting user feedback to accordingly modify the set of available categories, associations between categories and individual search results, as well as the building of category hierarchies in response to a search. The more feedback data the search engine device receives, the more capable the search engine 120 may become to generate appropriate and useful sets of categories and category hierarchies for search result queries and sets.

Additionally, feedback data indicating that certain categories are or are not useful, may also be applied to user-generated categories capable of being shared with some or all other users of the search engine. For example, user feedback data and category preferences may be limited to a social network including the user. User-generated categories receiving the most positive feedback, in some examples, are preferentially included in category hierarchies corresponding to a given search query and constructed by the search engine 120. Additionally, feedback can be provided, using the voting module 190, by allowing users of the search engine 120 to vote on categories included in a given search, as well as associations of categories with individual search results. For example, a user can submit a vote to search engine 120 that a certain category in a hierarchy of categories generated for a given search query is useful. Alternatively, users can indicate that certain categories are not useful, for example, because the name of the category is vague or that the category is too general to usefully limit the number of search result hits.

Figure 2:
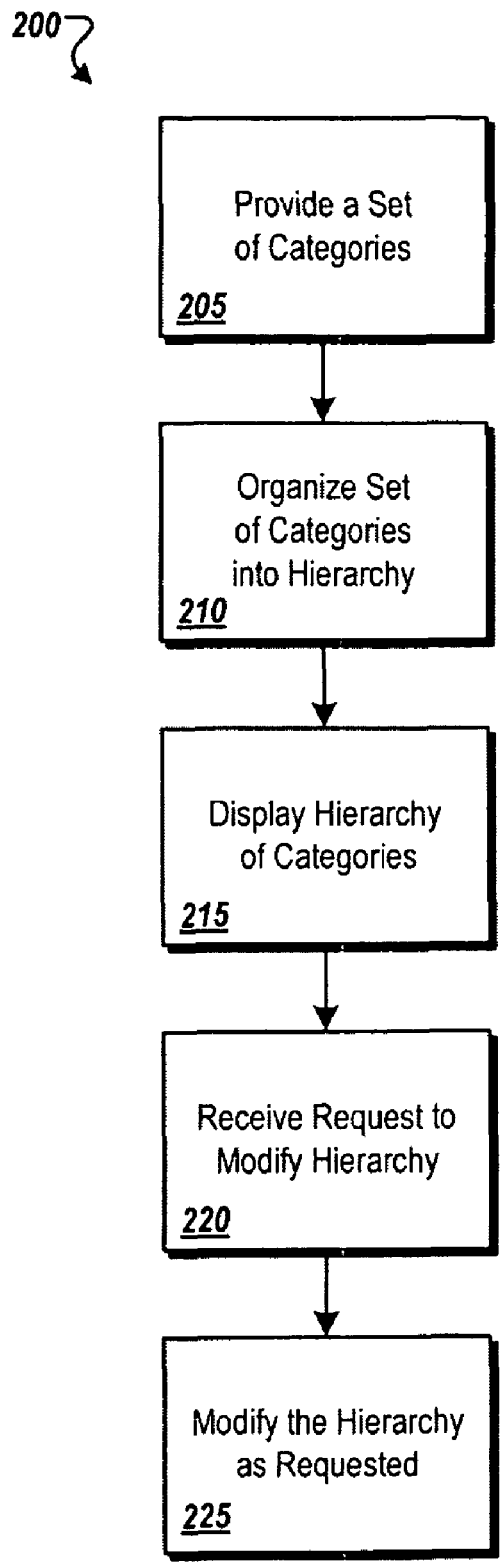
FIG. 2 is a flow diagram illustrating an example technique for organizing search results into a topic hierarchy.

FIG. 2 illustrates one implementation of a technique 200 for organizing search results into a topic hierarchy. A set of previously defined categories is provided 205 for a set of search results returned by a search engine device. The results can be returned in response to a user search query entered in a search engine. Each previously defined category generated may be associated with one or more search results. Not all search results may be associated with a category in the hierarchy of categories however. In some implementations, a separate category may be provided in order to assign a generic category to all search results not associated with a category in the hierarchy. For example, an "Unassigned" category may be generated automatically associated with the returned search results not associated with a category in the hierarchy.

A set of categories 210 can be organized into a hierarchy. The hierarchy of categories can include all or fewer than all of the categories associated with the returned search results. For example, the hierarchy can include a set of only the most relevant, most inclusive, or otherwise desirable categories. The categories in the hierarchy are then displayed 215. In some implementations, the displayed hierarchy may be, for example, a list of categories. The displayed hierarchy may also be displayed in an organizational tree, such as a list of folders with sub-folders grouped beneath each corresponding folder. A user request may then be received in response to the displayed categories to modify 220 the hierarchy of categories organizing the returned search results. The request may indicate that the user wishes to modify the hierarchy of categories, for example, by adding or subtracting categories from the hierarchy. A request to modify can also include a user indicating or voting whether or not the user approves of the inclusion of a category in the hierarchy or the association of a category with a given search result.

In response to a request to modify the hierarchy, or portion thereof, the hierarchy is then modified in accordance with the user request 225. A modification of the hierarchy 225 can, for example, result in the hierarchy being regenerated into a customized hierarchy based on the same search query. In implementations accepting a user vote regarding the appropriateness of a generated category hierarchy, the hierarchy can be modified in that feedback data relating to the user vote affects the generation of future category hierarchies for the same or similar search queries.

Figure 3:
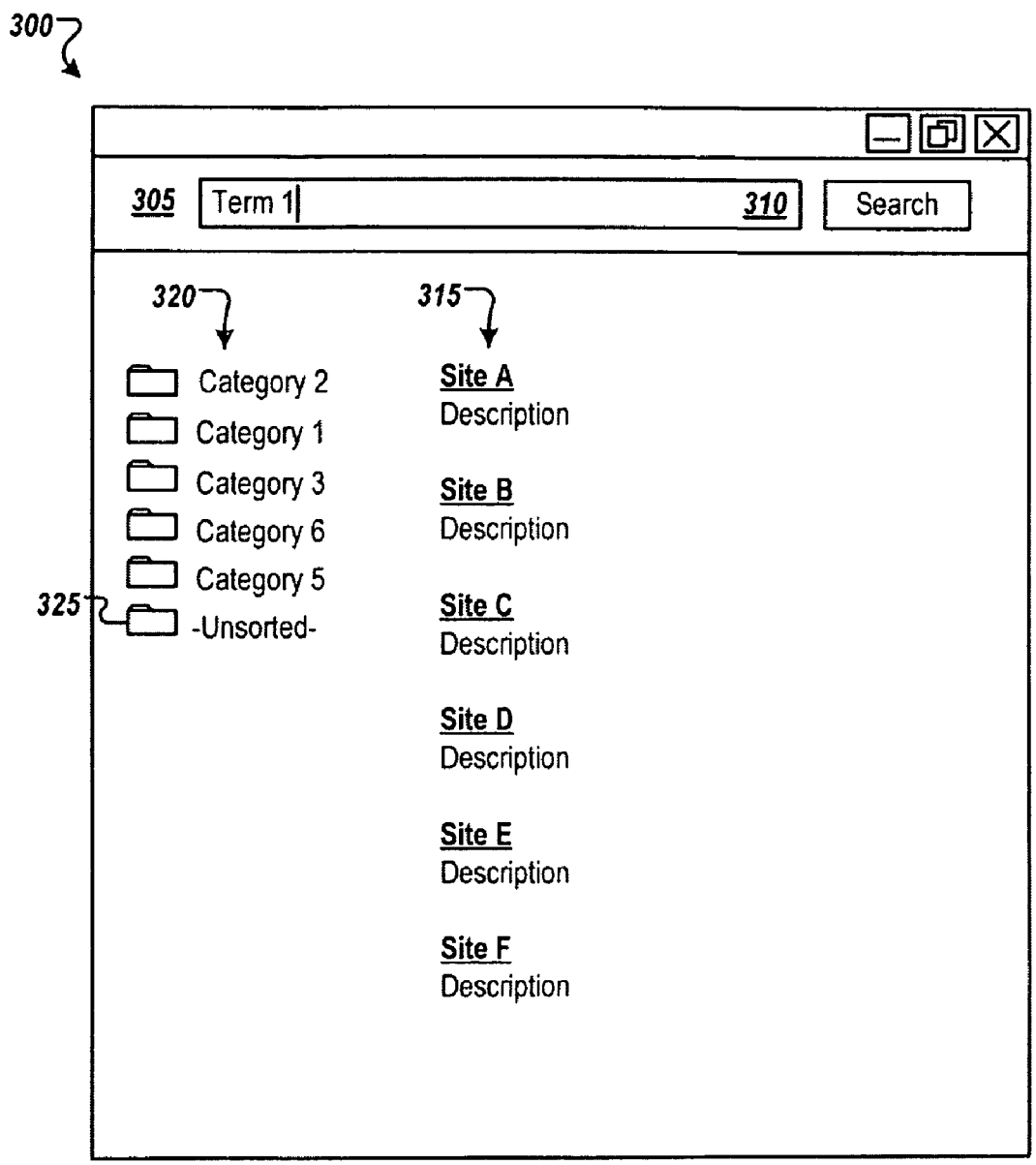
FIG. 3 is a screenshot of an example implementation of a search engine capable of creating category hierarchies.
Figure 5:
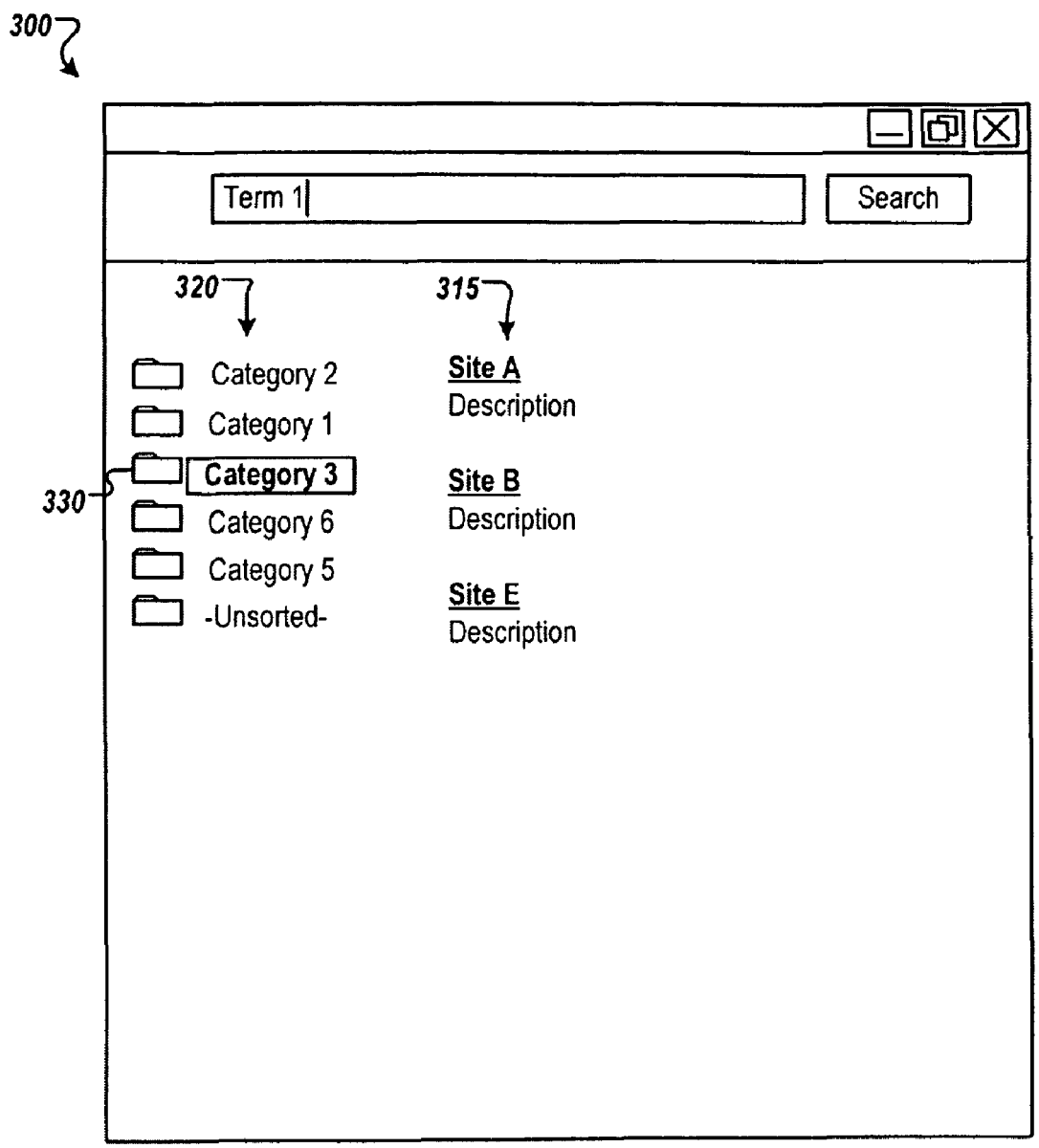
FIG. 5 is a screenshot of the search engine of FIG. 3, following the receipt of a request to modify a category hierarchy.

FIGS. 3-5 illustrate one example of generating a set and hierarchy of categories to organize a set of search results. In FIG. 3, a screenshot 300 of an example search engine is shown. A search term 305 has been entered in the search query field 310. The search engine has applied a search algorithm to return a set of search results, Sites A, B, C, D, E, and F, from a searched data set, such as a local computer, a private computer network, or a public network such as the Internet. A site is an individual search result and can be a webpage, computer presentation, document, application, or other computer file. The individual search results are provided in a list 315. In this example, a second list 320, displayed with the search result list 315, displays a set of categories associated with the returned search results 315—Categories 1, 2, 3, 5, 6, and an "Unsorted" category.

FIG. 4 illustrates an example table 400 summarizing what categories are associated with which search results from the displayed search result screen 300. An association between a category and a site can result from sites being identified that match a category, or by categories being identified that appropriately match a given site. Associations between sites and categories can be made by users of the search engine or automatically by the search engine itself. In this example, Site A has been tagged as being associated with Categories 1, 3, and 5. Site B has been respectively associated with Categories 2, 3, 6, and 7. Notice, that in this example, Site B is the only site from the set of search results associated with Category 7. In this example, Categories 4 and 8 are also only associated with a single search result. Consequently, in this particular example, the search engine algorithm for generating a hierarchy of categories 320 related to the set of search results 315 for display to the user elected not to include these categories in the displayed hierarchy 320. The goal of this particular algorithm may have been, for instance, to constrain the number of categories displayed to the user to simplify the interface or to streamline the generation of the hierarchy by only including categories with the most associations.

Other implementations may employ different hierarchy-building algorithms, for example, by building a hierarchy including categories that are unique relative to other categories in the set and not necessarily those categories associated with the greatest numbers of hits. Consequently, algorithms can be employed that attempt to group the set of search results into meaningful and distinctive categories. For example, if a user entered a search term "tiger" in the field 310 for an online web search, search results 315 could potentially include such variant subject matter as sites related to tigers (the animal), Tiger Woods, Tiger Airlines, or the U.S. Census Bureau's TIGER system. In some implementations, it may be desirable to provide an algorithm that attempts to generate a hierarchy of categories with categories related to each of the various subject matter related to a search query, allowing the user to further filter the results based on the user's true aim for the search.

Some search results may not be associated with a category in the initial hierarchy of categories or even any category for use by the search engine. In the example of FIG. 4, Site F is not associated with a category. Some implementations may sort search results not associated with an available category into an unaffiliated or "unsorted" category 325. Selection of the unsorted category 325 can result in only those search results being displayed in the list 315 that are not associated with a one of the categories included in the hierarchy 320. Some unsorted search results may not be associated with any category. Users can assist in making the category-building functionality of the search engine more robust by creating new categories or associating previously defined categories with those sites in the unsorted category, so that, in future searches returning these sites, the search engine can build category hierarchies based on these sites' associated categories.

Using the displayed category hierarchy 320 automatically generated by the search engine in response to a user's search, the user may limit the individual search results displayed in the list 315 by selecting one of the categories in the hierarchy 320. This can sort the results 315 on the basis of the subject matter of the category selected. For example, in FIG. 5, a user has selected the Category 3 hyperlink 330 from the list of categories 320. In this example, selecting the Category 3 hyperlink 330 had the effect of filtering the set of search results 315 displayed to the user, to only display those search results associated with Category 3 as set forth in FIG. 4—Sites A, B, and E. Display of the sites may include the name of the page, an identification of the file location (e.g., a web address), or even a short description of the content of the site. Upon selecting a category to sort the list of search results, other implementations may allow for the remaining, unassociated results to continue to display on the search engine interface 300, resorting the list 315 to display those sites associated with the selected category first, or at the top of the list 315, with the remaining categories beneath.

The ability to filter returned search results can be very useful in searches where the number of returned search results is very large. It is not unusual for some Internet search engines to return upwards of one million results for a single query 305. While FIG. 3 shows an implementation displaying all or a portion of the total, unsorted set of search results returned 315, some implementations may forego with an initial presentation of the initial search results in a list 315. These implementations may, instead, only initially display the category hierarchy 320 for the set of search results in response to a search query. The category hierarchy effectively displays a category-by-category summary of the entire search to the user aggregating every search result returned into a single, easy-to-read display. Users can select the category or categories of interest from the hierarchy 320 to display only those search results associated with the selected categories, effectively narrowing the scope of the search. In some implementations, selection of individual categories from the hierarchy of categories generated from a given search query, can be fed back to the search engine as feedback data capable of affecting the generation of future category hierarchies corresponding to related search queries.

Figure 6:
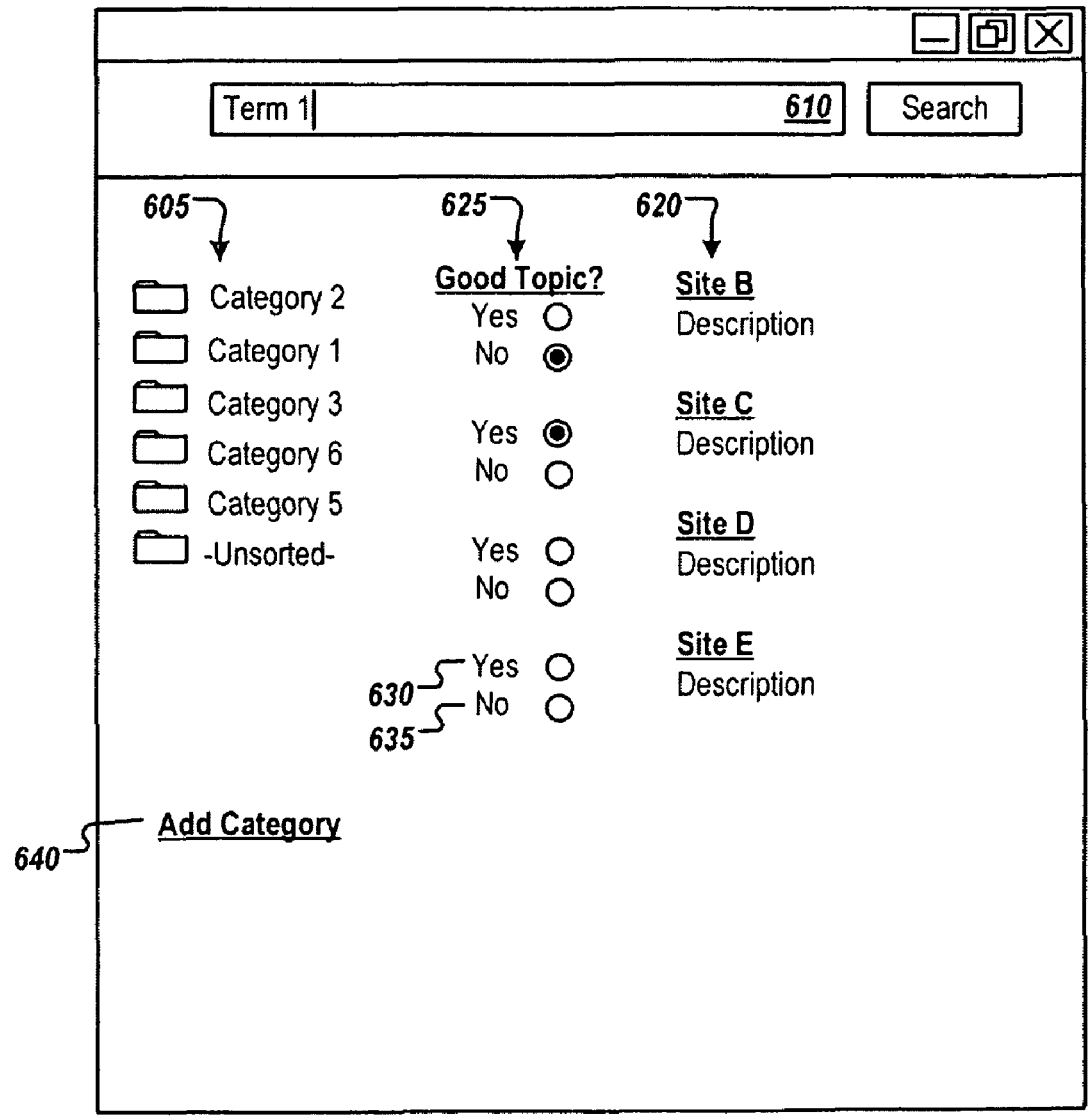
FIG. 6 is a screenshot of an example implementation of a search engine capable of accepting user votes related to a category hierarchy.

FIG. 6 illustrates another example of a search engine screenshot 600. As shown, the search engine has generated a category hierarchy 605 in response to a search query 610. Category 2 has been selected by the user, resulting, in this example, in a set of search results 620 displayed associated with the Category 2. A category voting mechanism 625 can also be included for access by the user. For instance, the voting mechanism 625 can allow users to register their opinion of whether a given site's association with a particular category is appropriate or not. Voting mechanisms can also be provided directed toward the individual categories in the hierarchy. In some implementations, a user may select a button 630 indicating that the association of a category with a given site is appropriate, or a button 635 indicating that the same association is not appropriate. Additionally, an "Add Category" link 640 can also be included, allowing users to associate a new original or previously defined category with a given search result not otherwise included in the category hierarchy 605. Other voting or user feedback can replace or supplement the illustrated voting mechanisms in this example, allowing users to provide feedback regarding what categories are associated with which sites, which categories are included in a displayed hierarchy, as well as the appropriateness of categories. These user feedback resources, included with the search engine, allow users of the search engine to create a category-based, wiki-type search engine, with collective user preferences and intelligence, at least in part, driving the intelligence, function, and algorithms of the search engine.

Figure 7:
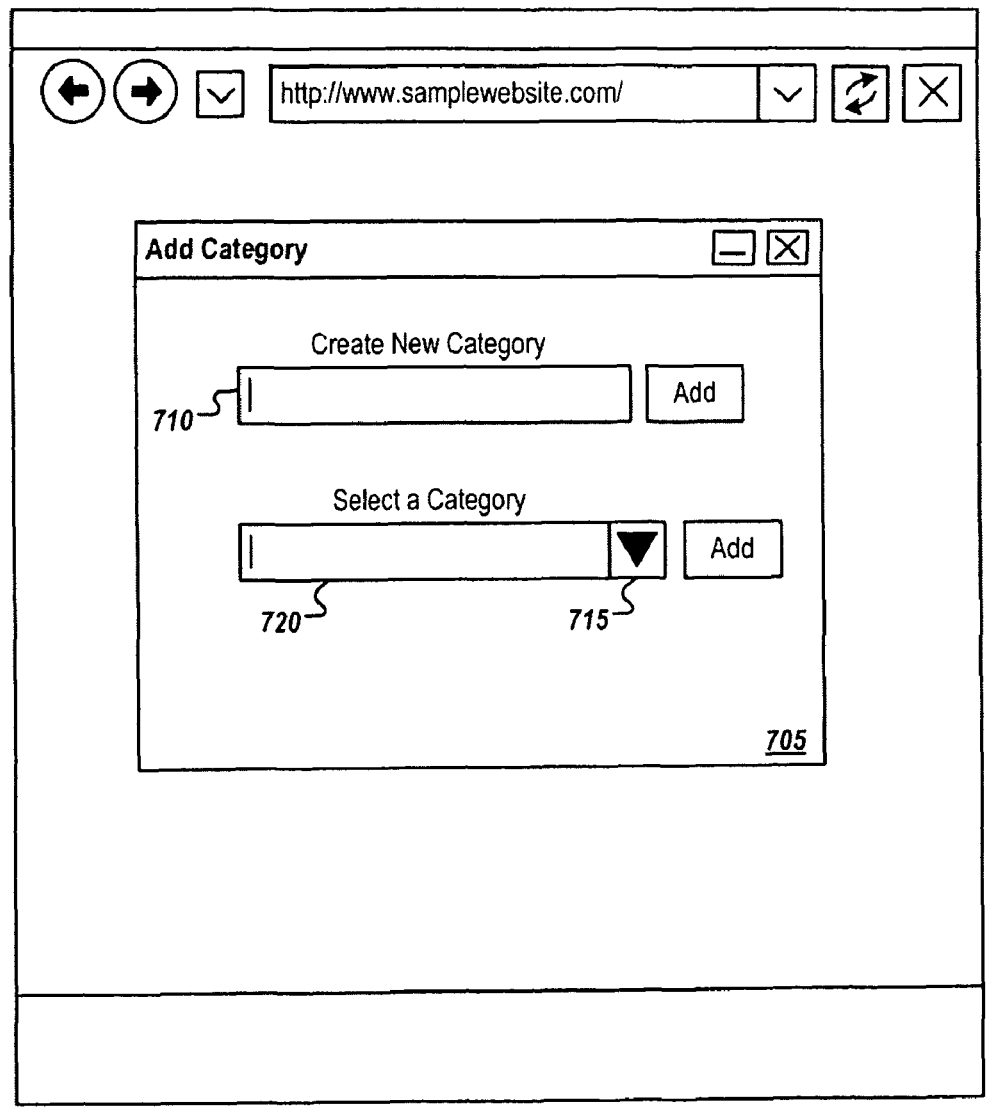
FIG. 7 is a screenshot of an example web browser capable of gathering category association data from a user for a search engine capable of creating category hierarchies.

FIG. 7 illustrates a screenshot of a webpage 700. In some implementations, as a user navigates the Internet, network files, etc., the user may desire to associate a category with a site. In some implementations, a user can modify category associations of a site while viewing the site. This can allow the user to survey the content of a site and provide feedback or category recommendations while viewing the site's context. In some implementations, the user can add a label or category for a given site. For example, as a user visits site 700, the user may choose to add a category. A pop-up window 705 may appear prompting the user to add a category association to the site. The user may associate an original category with the site by typing a new category name into text field 710, or may select a previously defined category from a drop-down list 715, or other list. In some implementations, the user can type a category search term in a text box provided with drop-down list 720 to narrow the list of previously defined categories for selection and association with the site.

A user's added category can be shared with and used by the search engine in building a category hierarchy in response to future search queries. Future users of the search engine can provide feedback regarding another user's added category. In some implementations, a user viewing a site 700 can view the categories already associated with the site. This can be facilitated through a software plug-in, API, or a toolbar used in connection with a web-browser, the plug-in or toolbar associated with the search engine and facilitating communication between the browser and the search engine device. The software plug-in can also facilitate a user assigning a category to a viewed site. Allowing users to view categories already associated with a site can guide users in their suggestions of additional sites to be associated with the site. Some implementations can allow users to view categories already associated with a site as well as allow the users to register their opinion regarding whether individual categories' associations with the site are appropriate or not, for example using voting buttons similar to those in a search engine voting mechanism 625.

A user's added categories, feedback regarding displayed categories, and other requests to modify the category hierarchy can be saved by the search engine device. A user's categories, votes, and feedback can be stored in connection with the user's profile. Feedback data can allow an implementation of the search engine to individually customize the generation of a category hierarchy for a user based on the user's profile. For example, user-created categories can be given preference to other categories in building a hierarchy of categories for display to the user. Also, user-provided feedback can be weighted relative feedback provided by other users in building a hierarchy of categories for the user. User-created categories and user feedback regarding pre-existing categories used by a search engine can also be shared with other users of the search engine as well as be used by the search engine itself to create more complete, robust, and accurate category hierarchies in response to user search queries.

Additional logic can be employed by a search engine to process feedback data and user-generated categories, establishing rules for integrating user-provided data into the functionality and content of the search engine. For example, logic can be employed to identify redundant and related user-created categories and the sites associated with these related categories, aggregating them to create a single common category and associated sites. Additional logic can set forth rules for determining how and what kind of user feedback, for example user votes, will affect future category hierarchy generation. For example, before an association of a category with a site is removed because of a user vote indicating that the association is inappropriate or irrelevant, programming logic can define rules that set forth that a critical number or percentage of other user votes first be received corroborating that vote.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions tangibly stored on a computer-readable storage device for execution by, or to control the operation of, data processing apparatus. In addition, the one or more computer program products can be tangibly encoded in a propagated signal, which is an artificially generated signal, e.g., a machine-generated electrical, optical, or electromagnetic signal, that is generated to encode information for transmission to suitable receiver apparatus for execution by a computer. The computer-readable storage device can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a cross-platform runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other.

While this specification contains many implementation details, these should not be construed as limitations on the scope of the invention or of what may be claimed, but rather as descriptions of features specific to particular implementations of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the invention have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
receiving a search request from a first user;
performing a search based on the search request;
providing a set of search results;
providing a set of categories for organizing the set of search results, wherein each category is identified based, at least in part, on one or more search results;
organizing the set of search results into a hierarchy of categories, the hierarchy including at least one category from the set of categories;
displaying at least a portion of the hierarchy of categories to the first user;

receiving a request from the first user to modify the hierarchy of categories;

modifying the hierarchy of categories in accordance with the request from the first user; associating the modified hierarchy of categories with a user profile for the first user;

storing the modified hierarchy of categories associated with the first user to provide a customized hierarchy of categories to the first user for use in response to subsequent search requests from the first user; and providing a customized category hierarchy for the first user based on the user profile for the first user in response to a subsequent search request from the first user.

2. The method of claim 1, wherein modifying the hierarchy of categories comprises adding a new category to generate a modified hierarchy of categories, the new category capable of being associated with one or more search results.

3. The method of claim 2, further comprising:
defining sets of search results, wherein each set corresponds to a category for organizing search results and comprises the one or more search results associated with the category; and
providing the search result from the set of search results.

4. The method of claim 2, wherein adding the new category comprises receiving a user selection from a list of categories.

5. The method of claim 2, wherein adding the new category comprises receiving a user entry defining the new category.

6. The method of claim 5, wherein defining the new category comprises a previously defined category not included in the hierarchy, automatically selected on the basis of the user entry.

7. The method of claim 1 wherein a plurality of user requests to modify the hierarchy of categories is received.

8. The method of claim 1, wherein the user request to modify the hierarchy of categories comprises feedback data relating to one or more of the categories, the method further comprising storing the feedback data in connection with a profile, wherein the profile is associated with the user.

9. The method of claim 1, further comprising:
associating a webpage with at least one category in response to at least one user request to associate the webpage with the at least one category;
displaying the webpage on a web browser;
displaying at least one category in connection with the webpage; and
receiving a user request to associate the webpage with the at least one category.

10. The method of claim 1, wherein the set of search results is a first set of search results, and the method further comprises organizing a second set of search results for the second user based on the modified hierarchy of categories associated with the first user.

11. The method of claim 1, wherein receiving a request from the first user to modify the hierarchy of categories includes a request to move a search result from a first category to a second category; and wherein modifying the hierarchy of categories in accordance with the request from the first user includes moving the search result from the first category to the second category.

12. A system for searching a data set and returning search results organized in a hierarchy of categories comprising:
at least one user computer device;
at least one data server storing a data set;
a search engine subsystem capable of receiving a search request from a first user, accessing the at least one data server, searching the data set to return search results organized in a set of categories, the categories identified based, at least in part, on the search results and organized in a hierarchy of categories, and the search engine subsystem further capable of accepting a request from the first user to modify the hierarchy of categories, modifying the hierarchy of categories in response to the request to modify the hierarchy received from the first user, associating the modified hierarchy of categories with a user profile for the first user, wherein the modified hierarchy of categories associated with the first user is different from a hierarchy of categories associated with a second user, storing the modified hierarchy of categories associated with the user profile for the first user to provide a customized hierarchy of categories to the first user for use in response to subsequent search requests from the first user, and providing a customized category hierarchy for the first user based on the user profile for the first user in response to a subsequent search request from the first user.

13. The system of claim 12, wherein the data set is a worldwide public network.

14. The system of claim 12, wherein the search engine subsystem comprises a subtraction module capable of responding to the request from the first user to modify the hierarchy of categories by removing at least one category from the hierarchy according to the user request.

15. The system of claim 12, wherein the search engine subsystem comprises a category adding a module capable of responding to the request from the first user to modify the hierarchy of categories by adding at least one category to the hierarchy according to the user request.

16. The system of claim 15 wherein the at least one added category is a user-created category.

17. The system of claim 12, wherein the search engine subsystem comprises a user voting module capable of receiving feedback data and using the data to affect a future organization of search results into the hierarchy of categories.

18. An article comprising a non-transitory machine-readable storage medium storing instructions for causing computer processing apparatus to perform operations comprising:
receiving a search query from a first user;
conducting a search of a data set based on the search query to generate a set of search results;
identifying a set of categories associated with the set of search results, the set of categories identified based, at least in part on, the set of search results;
organizing the set of search results into a hierarchy of categories;
presenting the hierarchy of categories on a graphical user interface to the first user;
receiving a user request from the first user to modify the hierarchy of categories;
modifying the hierarchy of categories or a future hierarchy of categories based on the received user request from the first user to modify the hierarchies;
associating the modified hierarchy of categories with a user profile for the first user,
storing the modified hierarchy of categories associated with the user profile for the first user to provide a customized hierarchy of categories to the first user for use in response to subsequent search requests from the first user; and
providing a customized category hierarchy for the first user based on the user profile for the first user in response to a subsequent search request from the first user.

19. The article of claim 18, wherein the user request to modify the hierarchy of categories includes a request to add a new category associated with at least one search result in the set of search results.

20. The article of claim 18, wherein the user request to modify the hierarchy of categories is user feedback data related to at least one category in the hierarchy of categories, and wherein the machine-readable medium further stores instructions for causing computer processing apparatus to perform operations comprising altering the association of a category with a search result based on the user feedback data.

21. The article of claim 18, wherein the machine-readable medium further stores instructions for causing computer processing apparatus to perform operations comprising:

receiving a user request to associate a file in the data set with a category; and associating the file with the category according to the user request.

22. The article of claim 21, wherein the file is a webpage and the user request to associate the file with the category is received through a web browser presenting the webpage.

23. The article of claim 21, wherein the file is included in a future set of search results and the category associated with the file according to the user request is identified in a set of categories associated with the set of future search results.

* * * * *

UNITED STATES PATENT AND TRADEMARK OFFICE
CERTIFICATE OF CORRECTION

| | | |
|---|---|---|
| PATENT NO. | : 8,214,361 B1 | Page 1 of 1 |
| APPLICATION NO. | : 12/242464 | |
| DATED | : July 3, 2012 | |
| INVENTOR(S) | : Sandler et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 523 days.

Signed and Sealed this

Thirteenth Day of November, 2012

David J. Kappos
*Director of the United States Patent and Trademark Office*